J. W. SHEPERDSON.
FLOW METER.
APPLICATION FILED OCT. 15, 1910.
1,156,635.
Patented Oct. 12, 1915.
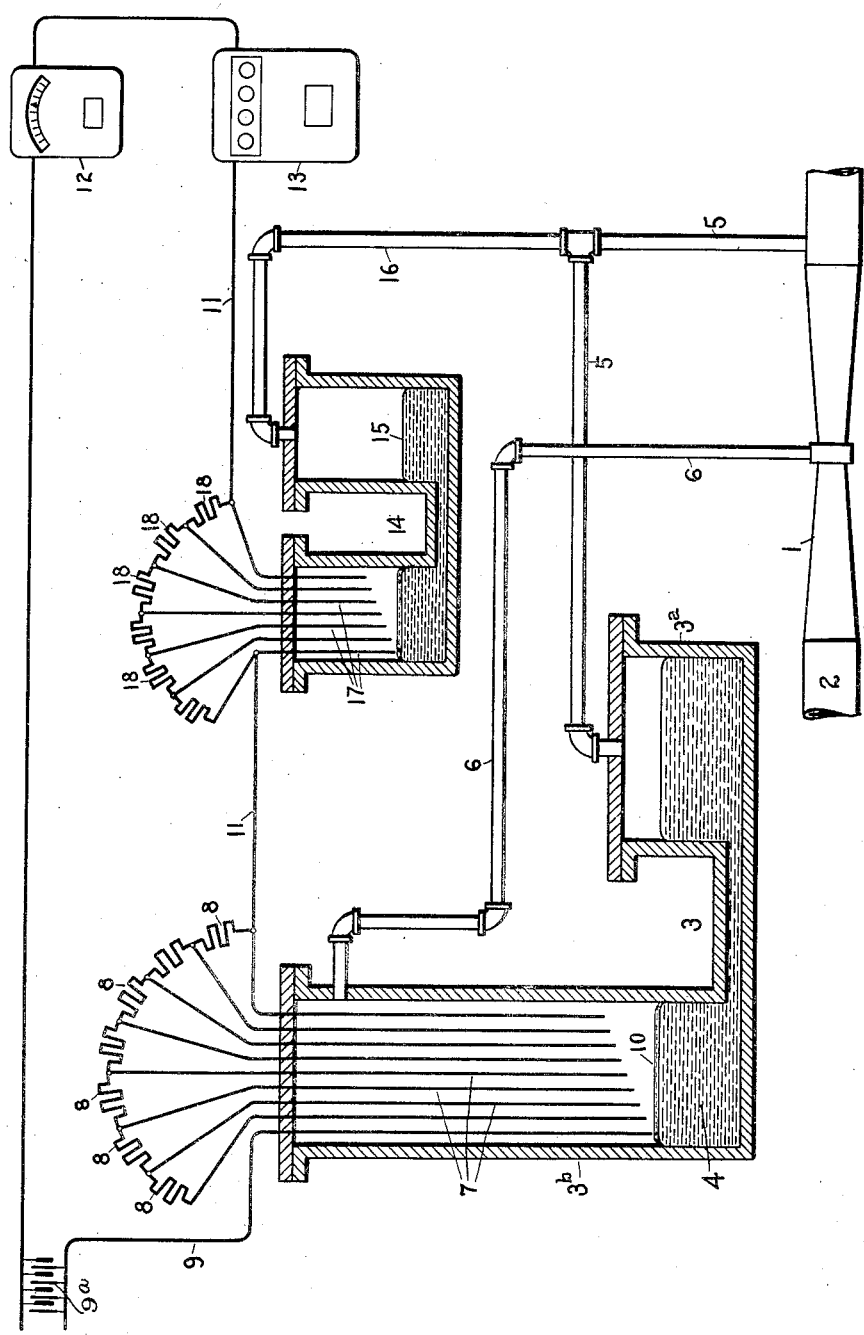
Witnesses:
Irving E. Steers
J. Ellis Elen
Inventor
John W. Sheperdson,
by R. ... Davis
His Attorney.

UNITED STATES PATENT OFFICE.

JOHN W. SHEPERDSON, OF JOHNSTOWN, PENNSYLVANIA, ASSIGNOR TO GENERAL ELECTRIC COMPANY, A CORPORATION OF NEW YORK.

FLOW-METER.

1,156,635.  Specification of Letters Patent.  Patented Oct. 12, 1915.

Application filed October 15, 1910. Serial No. 587,144.

*To all whom it may concern:*

Be it known that I, JOHN W. SHEPERDSON, a subject of the King of England and Ireland, residing at Johnstown, in the county of Cambria, State of Pennsylvania, have invented certain new and useful Improvements in Flow-Meters, of which the following is a specification.

This invention relates to devices for indicating and registering the flow of steam or other elastic fluid in a conduit.

The object of the invention is to enable a maker or consumer of steam to know the quantity of steam supplied or used in a given time. This general problem has been solved in various ways heretofore, but my invention provides a simple and inexpensive apparatus in which the varying flow of steam operates an electric registering mechanism. Provision is made for automatically correcting the readings for variation in static pressure.

The accompanying drawing is a diagram of apparatus and electrical circuits embodying my improved flow meter.

A Venturi tube 1 is illustrated as connected into the conduit 2 conveying the steam or other gas to be measured, but the invention is not limited to such a tube because other well known devices for creating a pressure difference bearing a definite relation to the rate of flow can also be used. A manometer is connected to said tube, and comprises a closed vessel 3, substantially U-shaped, and containing a quantity of mercury 4. One leg 3ª of said vessel is connected by a pipe 5 with the up-stream section of the Venturi tube. The other leg 3ᵇ of said vessel is connected by a pipe 6 with the throat of said tube. The difference in pressures causes the mercury to rise in the leg 3ᵇ, in which are located a plurality of vertical iron wires 7 of differing lengths. These wires are insulated from each other and from the vessel 3, and their upper ends are connected in series by the group of resistance coils 8. As the mercury rises in the leg 3ᵇ, these wires are successively immersed and the resistances are successively short-circuited. A wire 9 from some source of electric current of constant voltage, such as a battery 9ª or a lighting system, is carried into the leg 3ᵇ and terminates just above the normal level of the mercury, so that when the mercury rises it will connect said wire with the longest of the wires 7 and so on in succession. Transformer oil or glycerin 10 is placed on the surface of the mercury in leg 3ᵇ to prevent sparking and also to wipe off any mercury adhering to the iron wires. From the shortest wire a conductor 11 leads to one or more indicating and registering devices, preferably an ammeter 12 to indicate the rate of flow at any instant, and a wattmeter 13 to give the total flow for a predetermined period. Both instruments are suitably calibrated, in connection with the resistance coils 8, to insure that the flow of current through them shall be proportional to the flow through the conduit 2. Of course, the variations in current due to the successive submersion of the wires 7 occur step by step, so that the reading during the time the mercury is rising or falling between any two wires will be slightly inaccurate, but not enough to cause serious error in the total result.

The correction for variation of the static pressure of the gas measured is made by varying a second resistance in series with the one already described in such a way that the rate of current flow through the indicating and registering instruments is increased or decreased in proportion as the pressure rise or fall affects said resistance.

At 14 is shown a closed U-shaped vessel containing a body of mercury 15. In one leg of the vessel the mercury is exposed to the full conduit pressure by means of the pipe 16. In the other leg is trapped a volume of air which, by the fluctuations in the level of the mercury due to the variations in conduit pressure, will be compressed at all times to a pressure nearly equal to that in the conduit. The variations in the level of the mercury coöperate with a plurality of iron wires 17 of differing lengths to cut out or in resistance coils 18 in series with the instruments 12 and 13 and thus either speed up or slow down the wattmeter 13.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. The combination with a conduit for elastic fluids, of an agent therein for creating a pressure difference which bears a definite relation to the rate of flow, a U-shaped vessel containing a body of mercury, pipes connecting the respective legs of the vessel to said agent, a resistance means associated with the vessel and arranged to have its resistance varied by the rise and fall of the mercury in the vessel, a source of constant potential, an integrating wattmeter in series with said source and said resistance means, and means connected with the conduit and controlled by the pressure of the fluid therein for varying the current through the meter to compensate for variations of the static pressure of said elastic fluid.

2. The combination with a conduit for gaseous fluids, of a Venturi tube therein, a U-shaped vessel containing a body of mercury, a plurality of stationary wires terminating at different distances above the mercury in one leg of said vessel, a pipe connecting said leg with throat of said tube, a pipe connecting the other leg of said vessel with the up-stream section of said tube, resistances between said wires, a source of constant potential, an integrating wattmeter in series with said source, an integrating wattmeter in series with said source and said resistance, and means connected with the conduit and controlled by the pressure of the fluid therein for varying the current through the meter to compensate for variations of the static pressure of said gaseous fluid.

3. The combination with a conduit for conveying elastic fluids, of an agent located in the conduit that creates a pressure difference whose value bears a definite relation to the rate of flow of fluid, two closed U-shaped vessels each containing a body of liquid that is a conductor of electricity, means communicating the pressure difference created by the agent to the upper portion of one of the vessels, a connection between the other vessel and the conduit, two groups of resistance coils, means whereby the coils are cut in and out by the rise and fall of the liquid in said vessel, a source of electric current connected in series with the bodies of liquid and the resistance coils, and electrical indicating and registering devices in circuit with said coils.

4. The combination with a conduit for gaseous fluids, of a Venturi tube therein, a U-shaped vessel containing a body of mercury, a plurality of wires terminating at different distances above the mercury in one leg of said vessel, a pipe connecting said leg with the throat of said tube, a pipe connecting the other leg of said vessel with the up-stream section of said tube, resistances between said wires, a source of constant potential, an integrating wattmeter in series with said source and said resistances, a closed vessel containing a volume of air, means for varying the pressure of said air in response to variations in the pressure in the conduit, and a resistance device controlled by said means and air pressure for varying the current in the wattmeter circuit.

5. The combination with a conduit through which elastic fluid flows, of an agent located in the conduit that creates a pressure difference whose value bears a definite relation to the rate of flow of the fluid, a U-shaped vessel containing a body of liquid that is a conductor of electricity, means communicating the pressure difference created by the agent to the vessel so that the body of liquid is moved by said pressure difference, a plurality of stationary conductors terminating at different distances from the normal level of the liquid in one leg of the vessel, resistances between the conductors, a source of electric current, an electric meter in circuit with the source and resistance, another resistance in said circuit, and a device connected with said conduit and responsive to the pressure in the conduit for varying the last resistance.

6. The combination with a conduit through which elastic fluid flows, of an agent located in the conduit that creates a pressure difference whose value bears a definite relation to the rate of flow of the fluid, a U-shaped vessel containing a body of liquid that is a conductor of electricity, means communicating the pressure difference created by the agent to the vessel so that the body of liquid is moved by said pressure difference, a plurality of conductors terminating at different distances from the normal level of the liquid in one leg of the vessel, resistances arranged between the conductors, another U-shaped vessel containing a body of liquid that is a conductor of electricity, means connecting this vessel to the conduit so that the body of liquid is moved by variations in the static pressure in the conduit, a plurality of conductors terminating at different distances from the normal level of the liquid in one leg of the second vessel, resistances arranged between said conductors, a source of electric current, and an electric meter in circuit with the source and the resistances.

In witness whereof, I have hereunto set my hand this 1st day of October, 1910.

JOHN W. SHEPERDSON.

Witnesses:
F. R. WEAVER,
JOHN H. MORLEY.